Figure 1:
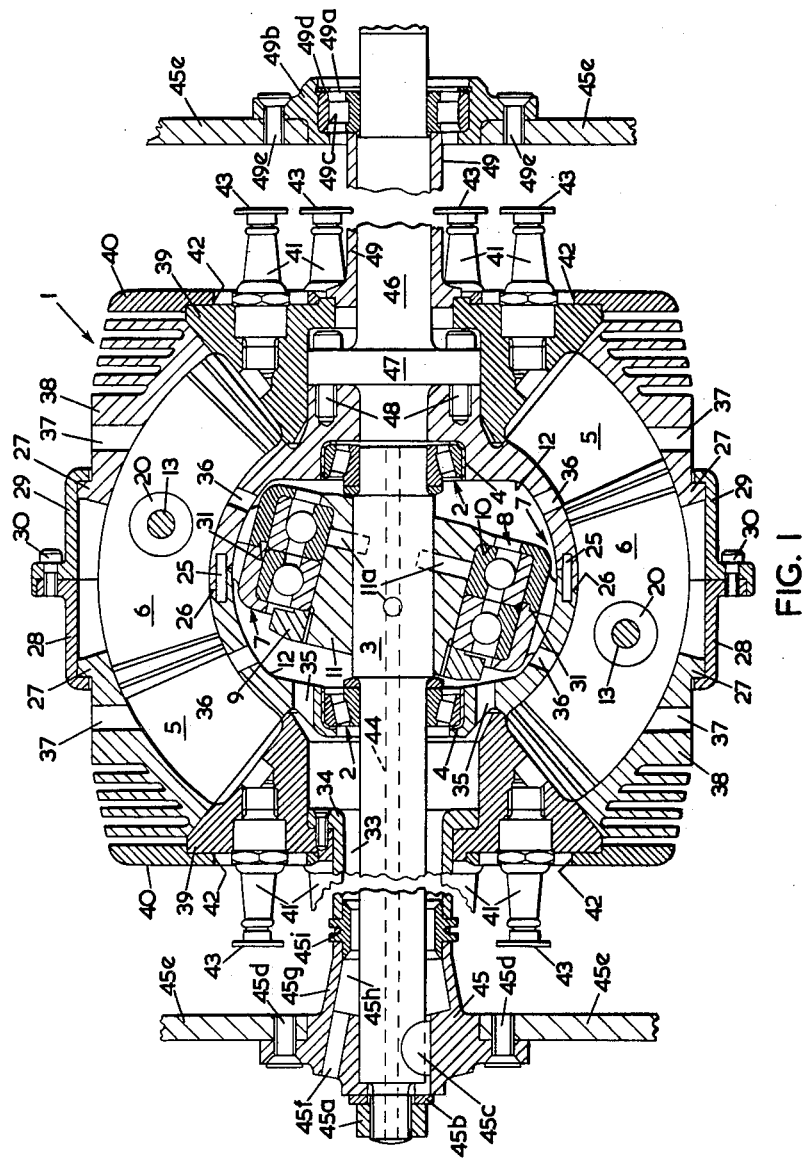

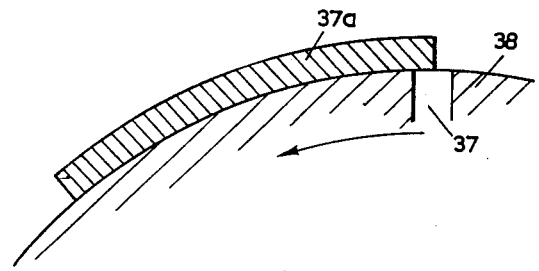
FIG. 4
FIG. 17
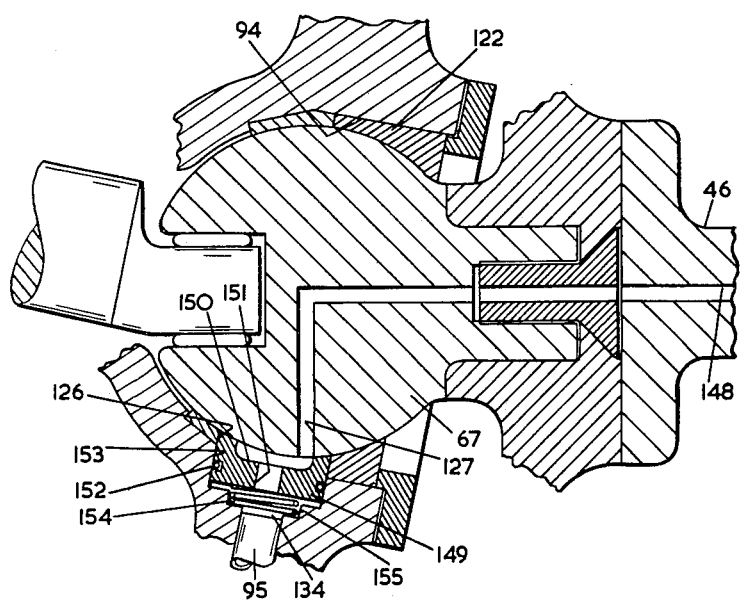

Jan. 18, 1966     C. HUGHES     3,229,677
ENGINES, PUMPS OR THE LIKE

Filed April 23, 1962     10 Sheets-Sheet 5

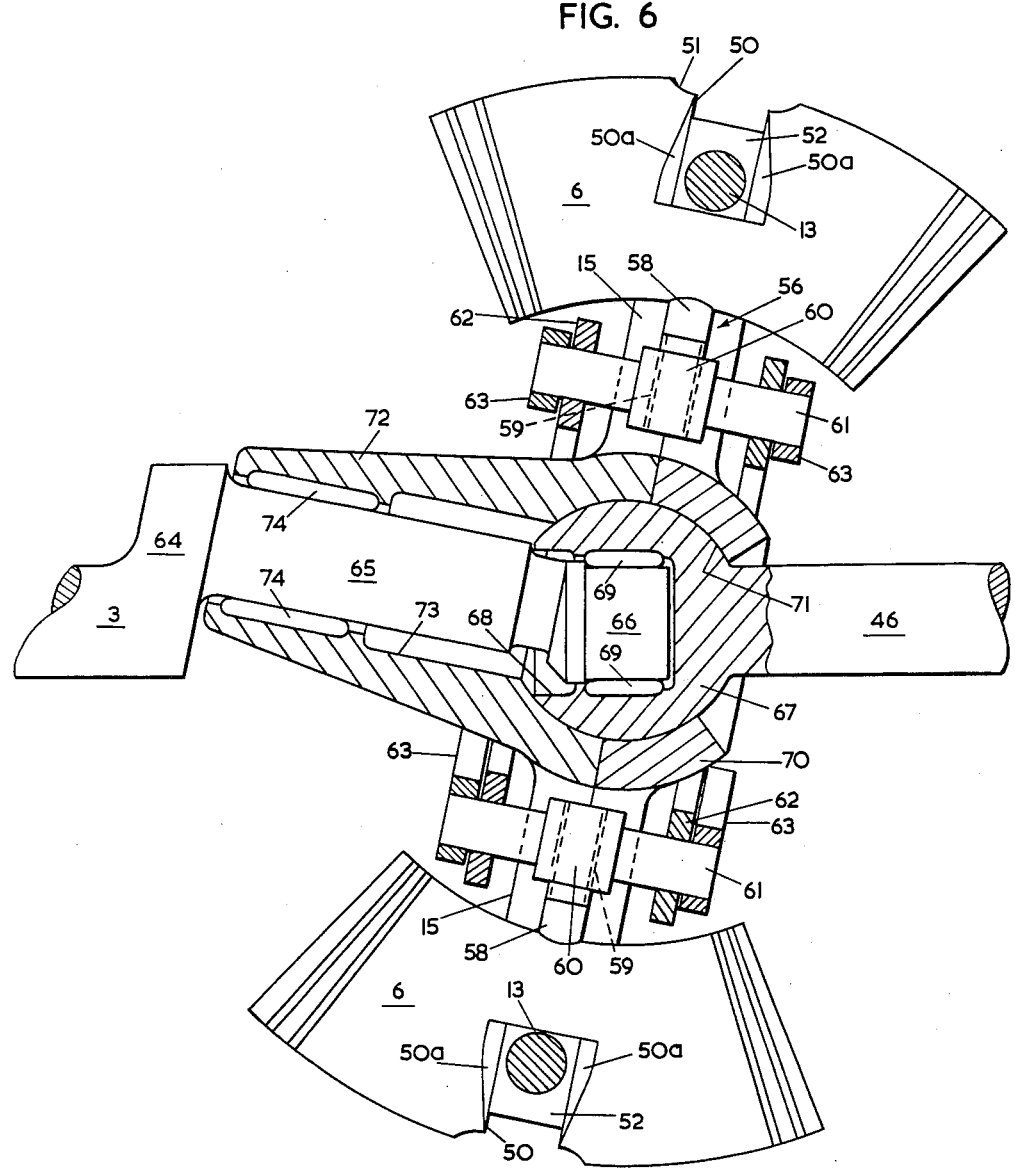

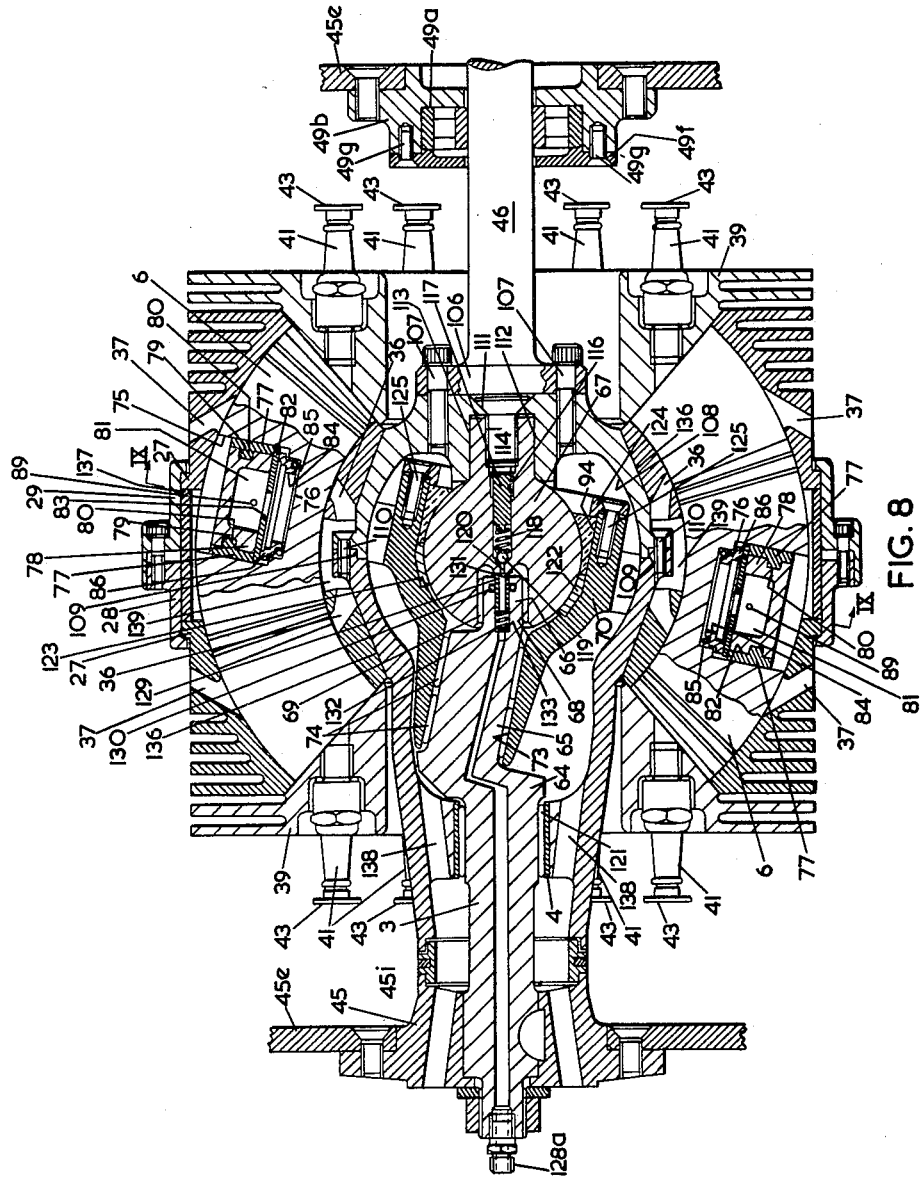

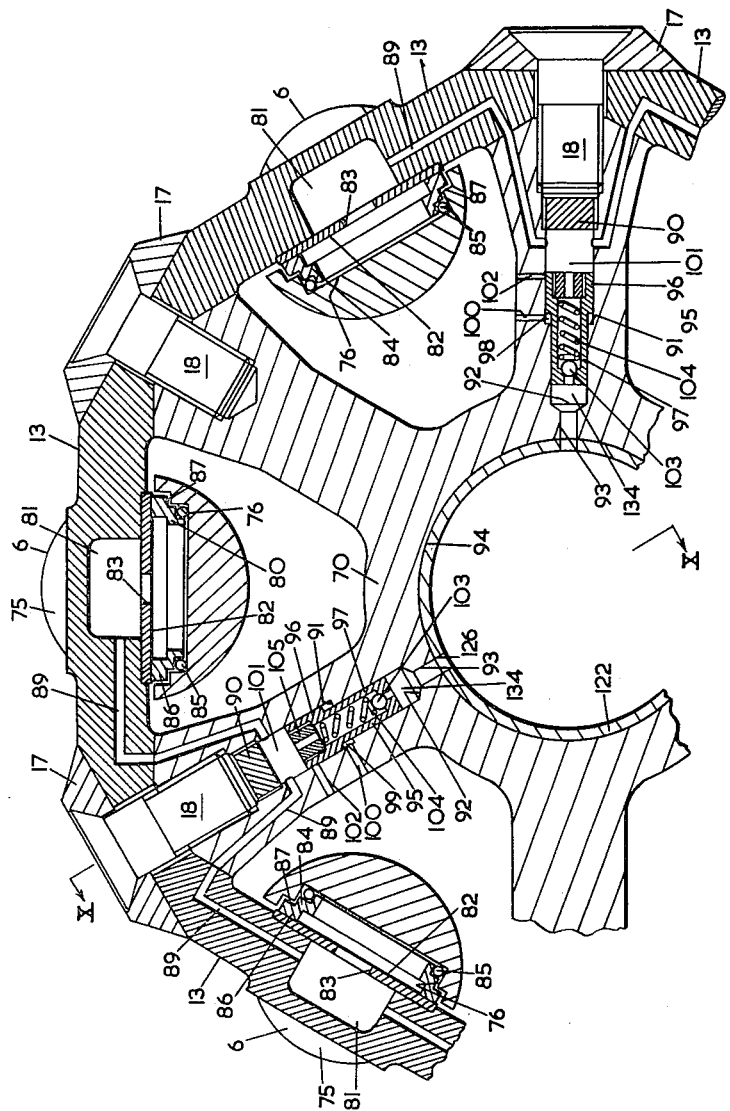

Jan. 18, 1966

C. HUGHES 3,229,677

ENGINES, PUMPS OR THE LIKE

Filed April 23, 1962

10 Sheets-Sheet 9

United States Patent Office 3,229,677
Patented Jan. 18, 1966

3,229,677
ENGINES, PUMPS OR THE LIKE
Cecil Hughes, Chandler's Ford, England, assignor to Orbital Engineering Limited, London, England, a British company
Filed Apr. 23, 1962, Ser. No. 189,611
Claims priority, application Great Britain, Apr. 24, 1961, 14,719/61; Mar. 12, 1962, 9,392/62
20 Claims. (Cl. 123—43)

This invention relates to mechanisms for use as engines, motors and pumps. It is applicable to engines such as interal combustion engines, whether operating on spark-ignition or compression ignition and whether employing the two-stroke, four-stroke or other operational cycle principle. It is similarly applicable to pressure-fluid operated engines and motors such as steam engines or hydraulic motors and also to pumps both for compression or scavenge purposes whether for dealing with liquids or gases. Such mechanisms falling within the field of application of the invention will be referred to hereinafter as "fluid mechanisms."

According to the invention, there is provided a fluid mechanism comprising a bank of cylinders each of which is in the form of a torus the pitch line of which constitutes a line of longitude of an imaginary sphere, the cylinders being symmetrically disposed about a first axis of said sphere and occupying a first zone thereof and, fitting the bank of cylinders, a series of pistons occupying a second zone of the sphere being symmetrically disposed about a second axis lying obliquely to the first axis and intersecting it at the centre of the sphere, each piston being supported relative to the second axis by a structure which permits pivotal movement of the piston about a radius of the sphere and, except for one piston or two diametrically opposed pistons of the series, which comprises means allowing transverse displacement of the pistons relative to the second axis, the arrangement being such that during relative rotation, about said first axis, of the cylinders to the second axis, the pistons slide sequentially in their respective cylinders.

The cylinders may be stationary and the second axis then rotates about the first axis so as to impart a swash-plate motion to the pistons disposed about it. Alternatively a bank of cylinders may rotate about the first axis and its pistons about a stationary second axis. In this latter case, the cylinders act as a flywheel for the operation of the mechanism.

While it is possible to employ the invention in a mechanism having a single bank of cylinders in which single-acting pistons slide, it is preferable, for the betterment of dynamic balance, to arranged that the pistons are double-acting and their ends are received in opposed banks of cylinders which occupy opposed zones of the sphere symmetrically disposed on each side of the central plane of the sphere perpendicular to said first axis.

However, in one particular form of mechanism according to the invention, single-acting pistons can be used in conjunction with a single bank of cylinders which are themselves formed in two co-axial and adjoining spherical zones, two opposed series of pistons being provided fitting opposite ends of the cylinders, said two series being disposed about respective axes oppositely inclined to the axis of said spherical zones. As in other mechanisms according to the invention, rotation, e.g., of the bank of cylinders about the first axis will cause the pistons fitting the opposite ends of each cylinder to move oppositely to each other, their mutual covergence and divergence producing cyclical variations in the enclosed volume of the cylinder. However, in this form of the invention for a given cylinder bore and volume the volumetric variation in each cylinder over the cycle is increased, without any increase in the angle of obliquity between the first and second axes, in comparison with the variation produced by a single piston head sliding in each cylinder.

A preferred feature of a fluid mechanism according to the invention is the provision of at least one closure member rotatable relative to the inlet and/or outlet ports of the cylinders to co-incide cylically with said ports to control their opening and/or cut-off points in each cycle. This is relatively simply arranged where the mechanism is designed for use as a pump, motor or two-stroke internal combustion engine and the bank of cylinders rotates about the first axis as such as closure member or members can be stationary and, if circumferentially adjustable, can be used to alter the timing of the valve opening periods to achieve optimum results in a given set of conditions.

The mounting of each piston of a fluid mechanism according to the invention may be arranged to permit limited radial movement of the piston. This freedom of movement may be desirable to accommodate differential expansion of the pistons and their supporting structure relative to the cylinders, but it is also of importance when the pistons and cylinders rotate in that it allows freedom of action for means producing a centripetal force acting on the pistons to reduce the centrifugal reaction of the pistons on their respective cylinder walls.

Such means may be derived from a counterweight rotating with the mechanism, the centrifugal force on the counterweight being applied to the piston through a lever system so as to act against the centrifugal force experienced by the piston or, in an alternative to this mechanical system, pressure fluid may be supplied through conduits leading to the pistons to act upon each piston against the centrifugal force thereon.

It is inherent, in the mechanical system referred to above, that the centripetal force produced increases in proportion to the square of the speed of rotation of the mechanism and can therefore be arranged to substantially cancel out said centrifugal reaction. Such a variation of centripetal force with the speed of rotation of the mechanism can also be achieved with hydraulic means as will be described in more detail in the specific description of the invention.

Figure 2:
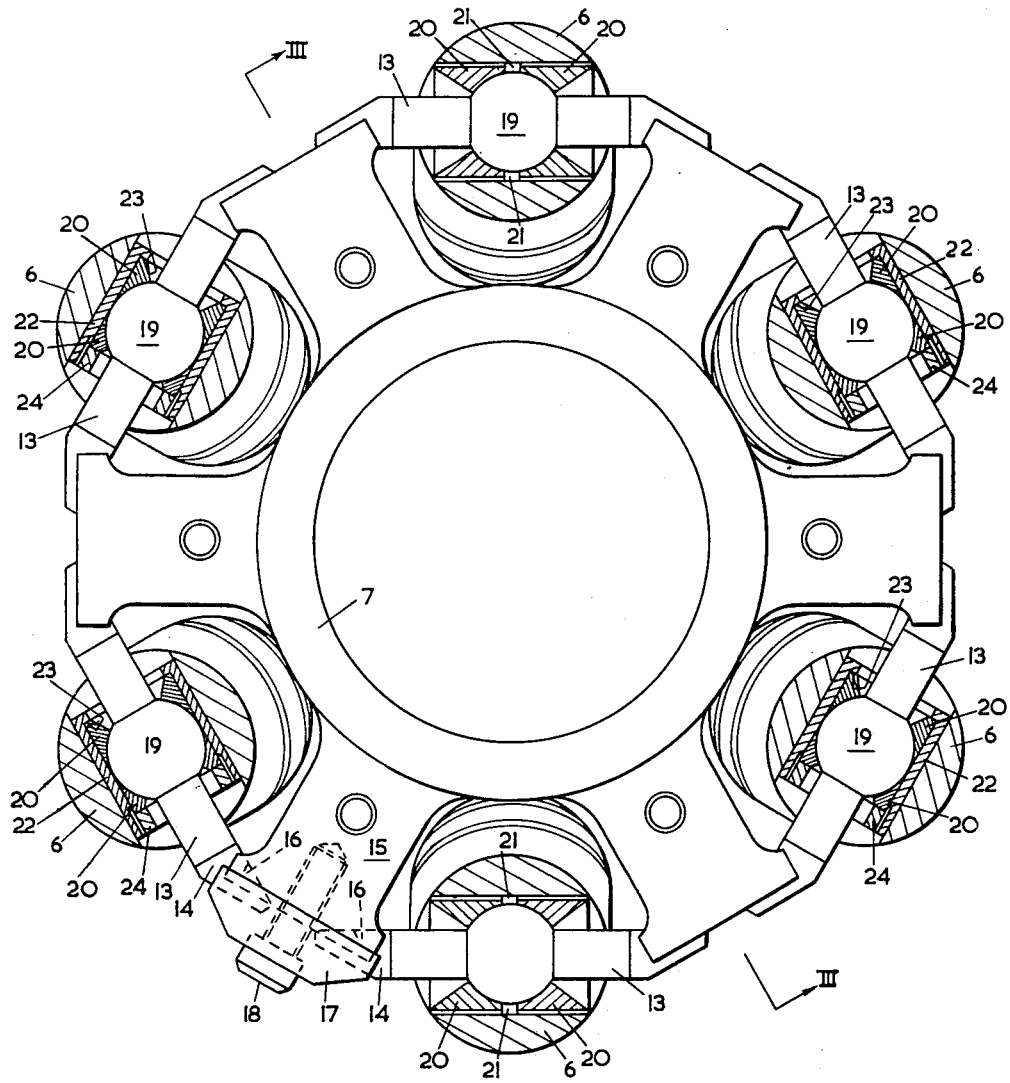
Figure 3:
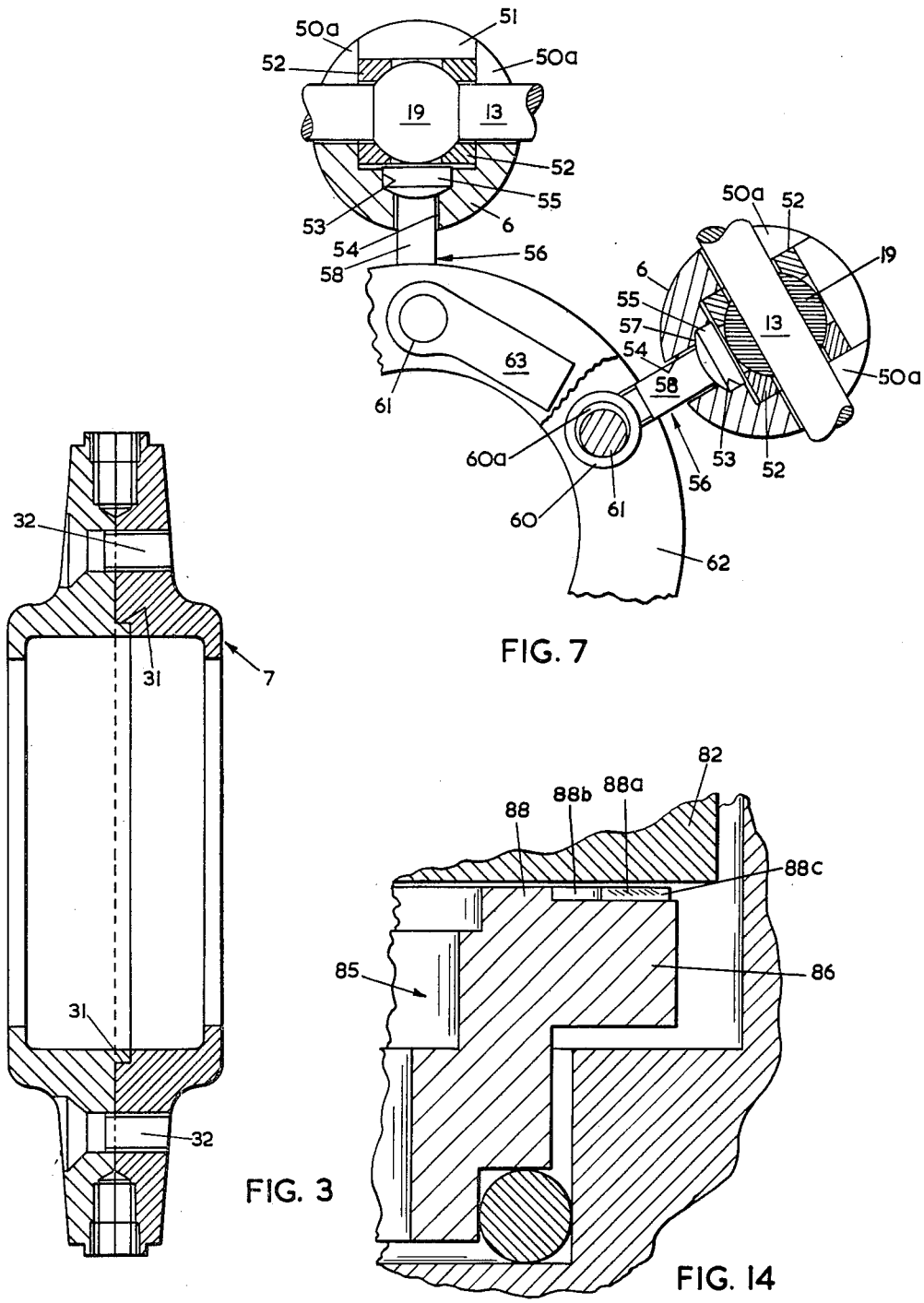
Figure 5:
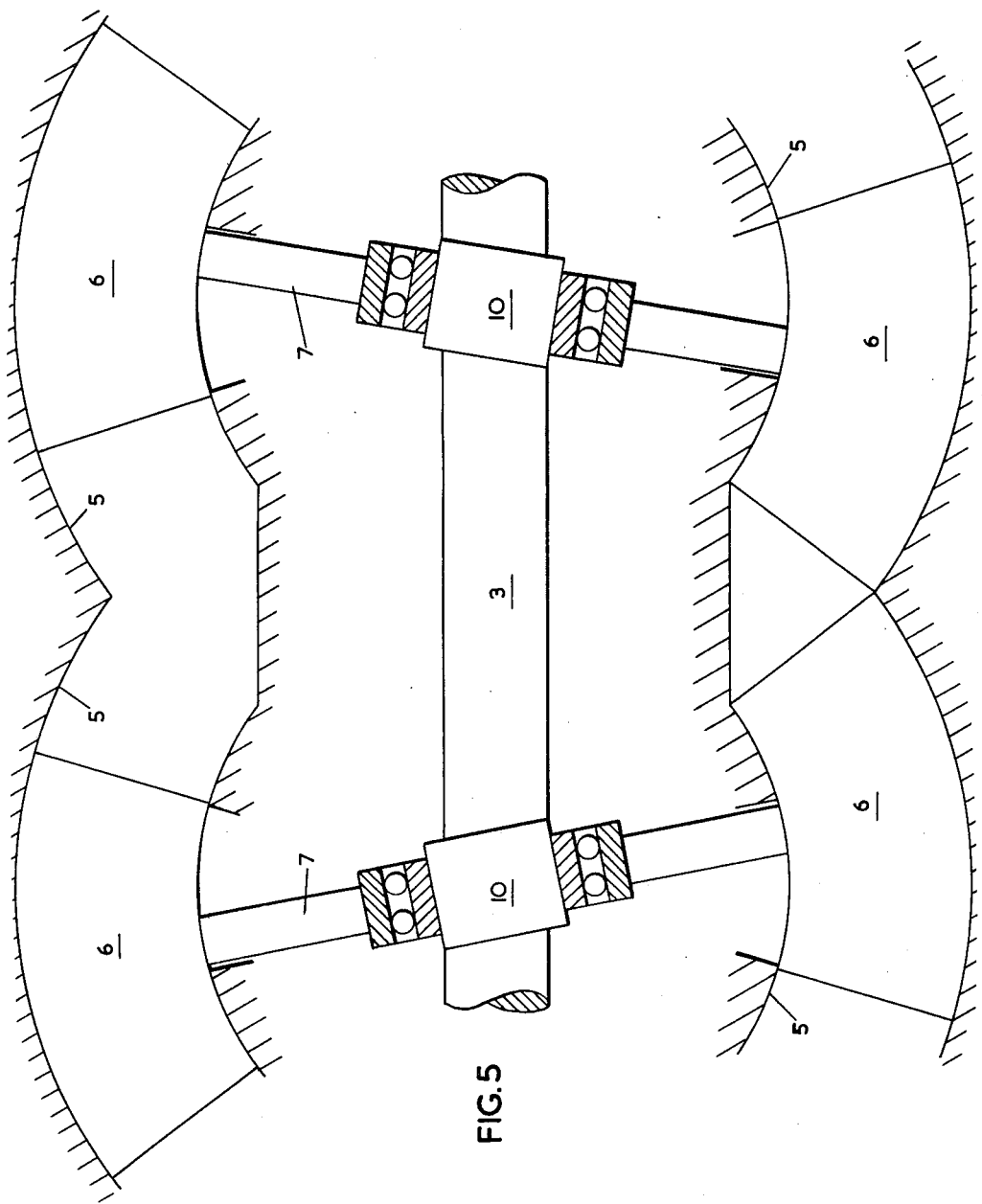
Figure 10:
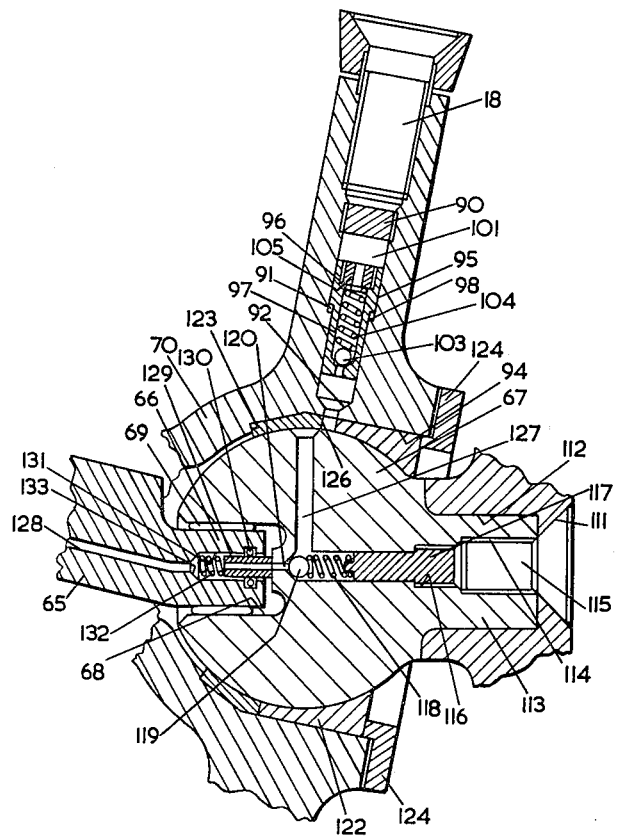
Figure 11:
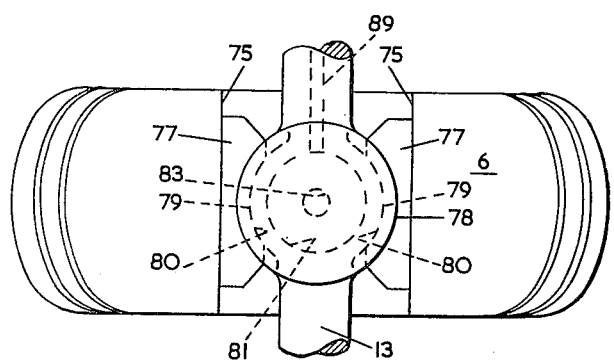
Figure 12:
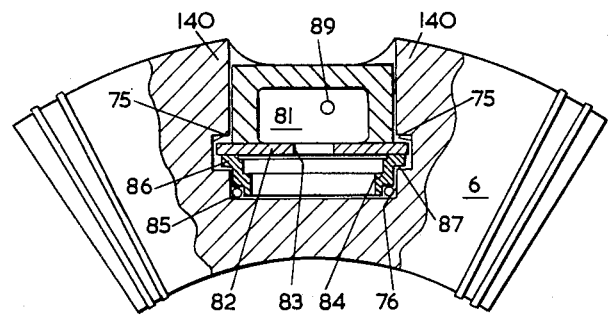
Figure 15:
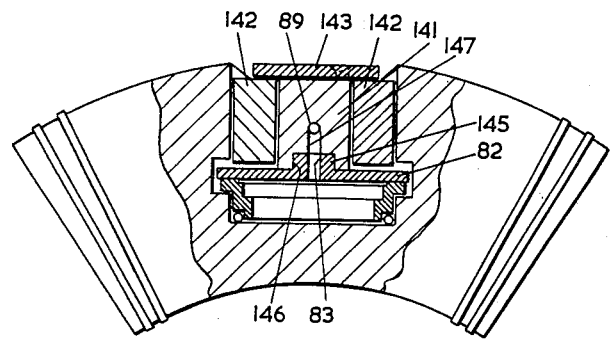

Various particular embodiments of the invention will now be more specifically described with reference to the accompanying drawings wherein:

FIG. 1 is an axial section through a rotary engine forming one embodiment of the invention, FIG. 2 is an elevation of the spider removed from the engine of FIG. 1 and also showing the pistons in section, FIG. 3 is a section through the spider alone on line 3—3 of FIG. 2, FIG. 4 is a diagrammatic sectional view showing a static closure member co-acting with an exhaust port, FIG. 5 is a diagrammatic axial sectional view of two engines as shown in FIGS. 1 to 3 coupled together and modified in order to function as one engine, FIG. 6 is a fragmentary axial section through a rotary engine similar to that shown in FIGS. 1 to 3 but embodying mechanical means for countering centrifugal force of the orbiting pistons and a modified connection between the spider and the axial shafts of the engine, FIG. 7 is a fragmentary view showing in detail the mechanical means for countering centrifugal force of the orbiting pistons in the engine of FIG. 6, FIG. 8 is an axial section through a rotary engine again similar to that shown in FIGS. 1 to 3 but embodying hydraulic means for countering centrifugal force of the orbiting pistons, a further modified connection between the spider and the axial shafts of the engine, and other constructional modifications, FIG. 9 is a fragmentary section on line 9—9 in FIG. 8 of the spider showing part of the hydraulic system, FIG. 10 is a fragmentary section on line 10—10 of FIG. 9 showing a further part of such hydraulic system, FIG. 11 is a view from a point radially outwardly of a secondary piston shown in FIGS. 8 and 9, FIG. 12 is a side view partially in section of a master piston used in conjunction with the secondary piston shown in FIGS. 8, 9 and 11, FIG. 13 is a view from the same aspect as in FIG. 11 of the piston shown in FIG. 12, FIG. 14 is a greatly enlarged sectional view of a detail of FIGS. 8, 9 and 12, FIG. 15 is a side view partially in section of a modified secondary piston to replace a corresponding piston shown in FIGS. 8, 9 and 11, FIG. 16 is a view from the same aspect as is FIG. 11 of the piston shown in FIG. 15, and FIG. 17 is a fragmentary axial sectional view showing a modification of the hydraulic system shown in FIG. 10.

One embodiment of the invention is illustrated in FIGS. 1, 2 and 3 in the form of a two-stroke cycle spark ignition engine having opposed banks 1 of six cylinders each symmetrically disposed and rotatable on bearings 2 about a shaft 3. In order to reduce heat flow from the cylinders to such bearings during or immediately after operation of the engine, heat insulating liners 4 are interposed between the bearings and the bank of cylinders. Each cylinder 5 is in the form of a portion of a torus, the pitch line of which constitutes a line of longitude of an imaginary sphere, which line of longitude passes through the axis of the shaft 3 at points forming opposite poles of the sphere, the cylinders occupying opposed zones of the sphere symmetrically disposed on each side of the central plane of the central plane of the sphere perpendicular to the axis of the shaft. A double-acting double-ended piston 6 is housed in each cylinder for oscillation along the pitch line thereof so that both ends of each cylinder are utilised as compression and combustion spaces. The pistons are carried on a spider 7 rotatable on bearings 8 retained between a nut 9 and an annular shoulder 10 about a bush 11 non-rotatably secured about the shaft 3 by pins 11a in such a manner that the axis of the bush is disposed at an acute angle to the axis of the shaft and passes therethrough at the centre of the imaginary sphere. The bush and bearings are accommodated in a space within the bank of cylinders, which space is defined by an inner annular wall 12.

The pistons are carried on the spider in such a manner that they occupy a second zone of the imaginary sphere extending into the zones of the cylinders but disposed about the axis of the bush. The connections between the pistons and the spider are in the form of gudgeon pins 13 fastened at their ends 14 to radial arms 15 of the spider by means of slots 16 receiving such ends 14, apertured retaining caps 17, and screws 18 passing through the apertures in the caps and threadedly received in the spider arms as shown at the foot of FIG. 2. The arms 15 pass through slots, with clearance, in the inner annular wall 12 opening into adjacent cylinders. In order to accommodate the pivotal movements between the pistons and the spider, universal joints are provided by forming the central region of each gudgeon pin into, or rigidly securing to the central region of each gudgeon pin, a ball 19 housed within a pair of mating cups 20 carried by each piston. Two diametrically opposite master universal joints accommodate only pivotal movement between their respective pistons and the spider and accordingly the mating cups are pinned to the pistons as at 21. Such pivotal movement, as explained hereinbefore, will only be about an axis through each master joint extending radially of the spider so that although the master joints are described as being universal joints they only need to be simple pivot joints. The remaining four secondary universal joints also accommodate movement between their respective pistons and the spider circumferentially of the set of six pistons. This extra accommodation of movement by the secondary universal joints is provided by allowing each of the respective pistons to be slidable about and longitudinally of a straight cylindrical guide sleeve 22 confining the mating cups therein and between an annular shoulder 23 and an internal nut 24. Since the guide sleeve is straight such extra movement will in fact be a combination of a chordwise movement and a pivotal movement about an axis through the joint parallel to the axis of the bush rather than truly circumferential and thus will give rise to a very slight radial movement, which, being so slight, is accommodated within the working clearances. However, this radial movement can be utilised as a pumping action to assist in lubrication.

In order to facilitate manufacture, assembly and dismantling of the engine, the bank of cylinders and the spider are each formed into two main portions each joined across their respective medial planes. In the case of the bank of cylinders, locating pins 25, interlocking surfaces 26, flanges 27 and a flange-connecting collar comprising two parts 28 and 29 secured together by means of screws 30 are provided to ensure that the two portions of the bank can be readily secured together in accurate register. As regards the spider, interlocking surfaces 31 and screws received in aligned bores 32 are provided for a similar purpose. The pistons may be made of light alloy and grooved to receive conventional piston rings.

The induction system of the engine comprises an inlet passage for a carburetted mixture disposed in or, as shown, about the shaft 3 and communicating through an annular passage 33 between the shaft 3 and a flanged sleeve 34 rotatable with the bank of cylinders and ports 35 with inlet ports 36 located in the inner annular wall of the bank of cylinders, which inlet ports are covered and uncovered as the pistons 6 oscilalte in their cylinders.

The exhaust ports 37 are disposed approximately opposite the inlet ports, that is, in an outer annular wall 38 of the bank of cylinders and communicate with an exhaust manifold (not shown) carried upon and encirling the bank of cylinders. This exhaust manifold may itself comprise an expansion and silencing chamber or alternatively the exhaust ports may open into a fixed manifold located at a close spacing from the rotatable bank of cylinders. In this case an exhaust fan is provided in the exhaust system to draw all the gases through the system and to prevent leakage of gases through the running clearance between the exhaust manifold and the cylinder block. A super-charger may be employed in order to perform the necessary scavenging of burnt gases from the cylinders, but super-charging itself is inefficient in relation to two-stroke cycle engines having the conventional arrangement of inlet and exhaust ports since of necessity an exhaust port remains open for a portion of the inlet and compression stroke. However, the modified two-stroke cycle engine described later in the specification has been found most suitable to be both scavenged and supercharged by a super-charger.

Each cylinder has its ends closed by cylinder heads integral with or, as shown, forming parts of two conical bodies 39 removable from the parts of the bank of cylinders and on which are fitted end plates 40, bolts, not shown, being provided to secure the conical bodies and the end plates to the cylinder bank. In each cylinder head, a spark plug 41 is carried and this may be conveniently arranged with its axis extending parallel to the shaft 3 so as to provide a ring of six spark plugs at each end of the bank of cylinders. The head terminal of each sparking plug extends through an aperture 42 in an end plate 40 and carries a flat plate 43 and as the engine operates, the plates 43 of each ring of spark plugs in turn contact electrically a static plate (not shown). A coil or magnetic ignition system (not shown) is provided to produce and supply the necessary current to the appropriate plugs via the static plates. By this means, the static plates and the rotating cylinder block serve as a distributor to produce a spark in the correct cylinder at the correct time.

A dry sump lubrication system may be used in which lubricant is pumped through a passage 44 or other passages formed in the shaft 3 and disposed in such a manner as to enable lubricant to be discharged in the region in which it is required. The lubricant will then move from these parts towards the outer periphery of the rotating bank of cylinders where it may be collected and returned to a storage tank and ultimately recirculated, although the lubrication of the pistons and cylinders may be achieved by the adoption of the petrol-oil system.

In operation, all the pistons sequently exert thrust against the spider through their joints but torque is transmitted to the bank of cylinders only through the master joints. On the application of torque to the spider the pistons describe one orbit about the axis of the bush while the cylinders describe another orbit about the axis of the shaft and act together as a flywheel. Since these axes are at an angle to each other the orbits of the pistons and cylinders are also at the same angle to each other so that the pistons sequentially oscillate in their cylinders with the arms of the spider moving in and along the slots in the inner annular wall of the bank of cylinders. A piston moving in its orbit passes through a point where it is nearest to the axis of the shaft 3, i.e. where it is at its closest approach to a cylinder head, and on continuing past this point its rotational velocity increases to a maximum where it reaches a point furthest from the axis of the shaft. The piston thus gathers momentum during this portion of its movement and this gathered momentum assists in rotating the cylinders while the piston again approaches the axis of the shaft 3.

The static shaft 3 is anchored at the end thereof projecting from the engine both against thrust and torsion to an anchorage 45 respectively by means of a nut 45a and washer 45b and by means of a Woodruff key 45c and the anchorage itself is secured by means of screws 45d to an engine mouting 45e. The anchorage is ported as at 45f to receive a carburetted mixture and has a skirt portion 45g extending towards the engine and providing an annular space 45h about the static shaft communicating with the passage 33. Between the skirt portion 45g and the flanged sleeve 34 is a resilient annular sealing and bearing member 45i which either floats or is secured to one or the other member.

The torque applied to the bank of cylinders may be taken off by a power take-off shaft 46 coaxial with the static shaft 3 and which has a flange 47 secured to the bank of cylinders by means of screws 48. The power take-off shaft is housed in a spacing sleeve 49 rotatable with such shaft and the bank of cylinders. The sleeve 49 spaces the engine from a bearing 49a for the power take-off shaft, which bearing is retained in a bearing housing 49b between an annular shoulder 49c therein and a circlip 49d. Screws 49e secure the bearing housing to the engine mounting 45e. The bearing 49a is such that it accommodates longitudinal thermal expansion of the power take-off shaft while running the engine.

Where the engine is a two-stroke cycle engine as particularly described, the conventional arrangement of inlet and exhaust ports which is necessary to bring about early opening of an exhaust port in order that there be substantial pressure relief in a cylinder before a fresh charge is admitted has the consequential disadvantage of late closing of the exhaust port so that it remains open for a portion of the compression stroke and is therefore unsuitable for efficient supercharging. However, the engine may be modified so that a supercharger can be used efficiently to supercharge as well as scavenge the engine. With this end in view a sharp opening and cut off at the exhaust ports or at both the inlet and exhaust ports at the required times may be obtained by providing stationary members which do not rotate with the banks of cylinders but which are located in juxtapositon to the exhaust ports or to both the inlet and exhaust ports so that they serve to open and close the ports sequentially.

In FIG. 4 is shown a stationary member 37a for coaction with an exhaust port 37 in the outer annular wall 38 of a bank of cylinders. It is to be imagined that the bank of cylinders is rotating in the direction of the arrow and the piston associated with the exhaust port is at bottom dead-centre as shown in FIG. 1. The stationary member is so positioned as to close the exhaust port for at least the period during the compression stroke between bottom dead-centre and the closing of the exhaust port by the piston so as to enhance the effectiveness of the compression stroke and, if desired, enable supercharging to be carried out between bottom dead-centre and closing of the inlet port.

Conveniently, the stationary closure members may be made in the form of sleeves which may, if desired, be made in one or more parts. The sleeves, or the individual parts making up the sleeve, may then be mounted so that their position can be adjusted so that the point in the cycle of the engine at which the ports are masked may be adjusted. By this means, the characteristics of the engine may be altered. It will be appreciated that the adjustment of the position of these sleeves is analogous to the altering of the profile of the cams of a cam shaft of a four-stroke engine. Moreover, this adjustment can be made whilst the engine is running. Not only may these sleeves be adjusted in order to provide an engine of desired power and torque characteristics, but the sleeves may be made either automatically or pneumatically adjustable whilst the engine is running so that, for example, the operating characteristics of the engine can be changed as its speed or rotation is varied.

It will be appreciated that the construction which has been described provides an extremely compact and light weight engine and in practice this has been found to be of high efficiency. Considerable modifications of the specific design of the engine may, however, be made. For example, in the particular embodiment described, double-acting double-ended pistons are provided. In place of this, however, single-acting single-ended pistons may be utilised. Moreover, where multiple banks of cylinders are provided, one or more of these banks may, if desired, be used to charge gases into other banks of cylinders. Alternatively, the engine may be constructed as a four-stroke cycle petrol engine or as a two or four stroke cycle diesel engine. The engine may find application either as a small size and small capacity engine, for example for use in driving motor vehicles, in which case it may be arranged to rotate at high speeds, or it may be constructed as a large capacity, relatively slow moving diesel engine which may find particularly useful application for marine use. In fact, when a large engine is provided having a large number of cylnders, then a marine engine can be provided, the rotational speed of which may be such as to allow the engine to be directly coupled to a propeller. This avoids the necessity of interposing any reduction gears between the engine and the propeller shaft although the course, if the propellers are to be able to be run in reverse, then a reverse gear box must be provided except in the case of a two-stroke cycle engine which can run in either direction with equal facility.

In FIG. 5 is shown diagrammatically a modification of the engine particularly described, wherein the cylinders at one end of the bank, instead of being closed by cylinder heads, communicate with cylinders of another similar bank. The two banks of cylinders are rotatable together about the same shaft and the bushes 10 for the two spiders 7 are disposed at the same angle to the shaft 3 but in opposite senses so that one part of the modified engine is a mirror image of the other part. With this arrangement, the spaces between the pairs of corresponding pistons 6 in the regions of the junctions between the pairs of communicating cylinders 5 are utilised as compression or combustion spaces. With this arrangement, the angle between the axis of each spider 7 and the axis of the shaft 3 can be reduced and a powerful, efficient and high compression engine can be produced.

The improved engine has, in general, a relatively small frontal area for a given power output, and temperature expansion is symmetrical because of the symmetry of the high temperature regions within the engine mass. The absence of a flywheel permits a considerable saving in weight to the extent that it may be made readily portable.

The parts of this engine are not normally so highly stressed as in the conventional internal combustion engines and lubrication of the cylinder walls may be assisted by the centrifugal force resulting from the rotation of the cylinders assisted by the periodic acceleration in the rotation of the pistons.

However, when running a mechanism according to the invention in the mode described in relation to the engine illustrated in FIGS. 1 to 3, i.e. by rotating a bank of cylinders about a static shaft, very high operational speeds are limited by virtue of the centrifugal force acting on an orbiting piston producing excessive bearing loadings between the piston and its connection with the spider. In order to relieve this condition and thereby greatly increase permissable rotational speeds, there are provided, within the scope of this invention, improvements which, while substantially and automatically balancing the centrifugal force acting on a piston at all speeds of rotation within the adopted speed range, at the same time provide automatic compensation for differential expansion which may take place within the mechanism as the result of temperature rises due to increased speeds and power output.

Since it is well known that centrifugal force increases with the square of the speed of rotation, it will be appreciated that whereas the engine illustrated in FIGS. 1 to 3 has run at a speed of 5,000 r.p.m. without undue bearing loading between a piston and its bearing connection with the spider, this loading increases by approximately four times when the speed is increased to 10,000 r.p.m. In order that such increases or rotational speed can be realized without undue increase of the loadings on the bearings between a piston and its supporting structure, balancing arrangements can be provided to produce a centripetal force acting upon the pistons and increasing with the speed of rotation of the mechanism to reduce the centrifugal reaction of the pistons on their respective cylinder walls.

In one such construction the connection between a piston and the spider is modified in order to allow of limited radial movement of the piston to the spider. This is effected by housing the ball on the gudgeon pin within two mating cups with respect to which the piston is slidable radially of the spider. The piston may otherwise be immovable with respect to the cups in which case the cups are relieved to accommodate pivotal movement between the cups and the piston on one hand and the gudgeon pin on the other hand about a radius of the spider. Alternatively, such pivotal movement may be accommodated by allowing the piston to move with respect to the cups about such radius.

The piston is also connected to one end of a lever arrangement at a point radially inwardly of the spider from the ball on the gudgeon pin and between two adjacent radiating arms of the spider. The point of connection is slightly offset from a fulcrum which may be regarded as fixed in relation to the spider. Also pivotal about the fulcrum on the opposite side thereof from the point of connection of the piston to the lever arrangement is a counterweight which is considerably smaller and lighter than the piston but which has mechanical advantage thereover since its centre of gravity is considerably further from the fulcrum than such point of connection.

As specifically applied to the engine illustrated in FIGS. 1 to 3 the modified connection between a double-acting double-ended piston and the spider is formed as shown in FIGS. 6 and 7 by cutting-away the portion of the piston 6 intermediate its ends to provide a transverse slot 50 opening radially outwardly of the spider and relieved as at 50a. In the slot is cut a bore 51 which is cylindrical about a radius of the spider. The bore 51 interrupts the walls of the slot and provides a recess in the floor thereof. Within the bore are inserted the radially inner ends of two mating semi-cylindrical cups 52 which house the ball 19 on the gudgeon pin 13. The floor of the slot is at a clearance from the gudgeon pin in order to allow for thermal expansion and pivotal movement of the piston relative to the gudgeon pin and the depth of the recess is such that it will allow radially sliding movement of the piston about the mating cups. Furthermore, since the mating cups together and the recess are cylindrical and the slot is relieved as at 50a there is accommodation for pivotal movement between the piston and the mating cups about a radius of the spider.

The floor of the recess forming part of the bore 51 opens into a smaller compartment 53 having a cylindrical wall and a concave spherical floor which itself opens into a still smaller cyindrical bore 54 extending to an opening in the radially inner side of the intermediate portion of the piston. Housed within the compartment 53 is an enlarged end 55 of a link 56, the enlarged end providing a convex spherical annular shoulder 57 which fits into the concave spherical floor of the compartment. The link has a shank 58 which is cylindrical in cross-section and which extends with clearance through the bore 54 thus allowing for limited universal articulation between the piston and the link. The radially inner end 59 of the link shank is provided with an external screw thread which is threadedly received in an internally screw threaded bore or hole in an anchor member 60 having a plain cylindrical bore therethrough. The plain cylindrical bore has an axis which extends normally to the plane of the spider and slidably and rotatably receives an eccentric portion of 60a a cylindrical control shaft 61. The provision for sliding movement allows for any movement of the link out of the plane of the spider that may be required during engine rotation. The axis of the plain bore and thus of the eccentric portion of the control shaft intersects the axis of the link and is slightly offset from the axis of the control shaft such that a force applied along the axis of the link applies a moment to the control shaft about its axis.

On each side of the spider in a plane parallel to the plane thereof is a restraining ring 62 concentric with the spider. The rings are of the same diameter and each have holes therethrough equally spaced circumferentially thereabout, one for each piston. Each hole has an axis lying normally to the plane of the spider and thus normally to the planes of the rings and receives one end of a control shaft 61 for rotation in the hole. The restraining rings and the control shaft thus resemble a squirrel cage and furthermore the control shafts form the only supports for the rings.

The opposite ends of each control shaft 61 project through the holes in the rings and fixedly mounted on each projecting end is a counterweight 63 having its centre of gravity on the opposite side of the axis of the control shaft from the axis of the link. This counterweight is considerably smaller and lighter in weight than the piston but it possesses a mechanical advantage thereover since the distance between the centre of gravity of the counterweight and the axis of the control shaft is considerably greater than the distance by which the axis of the link is offset from the axis of the control shaft. The mechanical advantage of the counterweight over the piston, the respective weights of the counterweight and piston, and their respective radii of gyration are correlated so that the centrifugal force of the piston when orbiting is sensibly balanced by a centripetal force acting on the piston via the link, this centripetal force being caused by the moment which in turn is produced by the centrifugal force of the orbiting counterweight.

In order to take into account thermal expansion of the bank of cylinders the correlation of values mentioned above is carried out to provide in practice a slight imbalance between the centrifugal and centripetal forces acting on each piston when the engine is running cold in the sense that there is a slight preponderance of centirpetal over centrifugal force. The bank of cylinders either expands or contracts according to temperature thereby varying slightly the pitch diameter of the group of cylinder bores. However, in view of the mechanical advantage of the counterweight over the piston, a slight increase in the radius of gyration of the piston resulting from a slight increase in the pitch diameter of its cylinder causes a greater reduction in the radius of gyration of the counterweight. Thus, although this change does not noticeably alter the mechanical advantage there is a noticeable change in the ratio of respective radii of gyration of the counterweight and the piston, which reduces the ratio of the centripetal to the centrifugal forces from a value slightly exceeding unity to a value which is sensibly unit.

Thus, although the pistons are orbiting they are not exerting any appreciable centrifugal thrust on their respective cylinder walls. There is also no appreciable bearing loading due to centrifugal force between the ball on the gudgeon pin and the two mating cups housing same. The engine can therefore be run at very high speeds with safety and even if an increase in engine speed is accompanied by further thermal expansion of the bank of cylinders the consequent alteration in the ratio of the radii of gyration of a counterweight and a piston will alter the balance between the centrifugal and centripetal forces acting on the piston only to an extent producing a very small resultant centrifugal force well within the limits of safety.

In the modified connection between a piston and the spider, in the case of a master piston the ball 19 is rigidly mounted on the gudgeon pin 13. However, in the case of a secondary piston, in order to accommodate movement thereof circumferentially of the spider the ball 19 is slidably mounted on the gudgeon pin 13. One piston of each of these types is shown in FIG. 7.

The arrangement of a slidable ball on the gudgeon pin to connect a secondary piston to the spider possesses an advantage over the corresponding arrangement with respect to FIGS. 1 to 3 wherein the ball 19 is rigid with the gudgeon pin 13 and the secondary piston is slidable about and longitudinally of a straight cylindrical guide sleeve 22 confining the mating cups 20 housing the ball. In the earlier arrangement the torque contributions of the secondary pistons to the cylinders are transmitted via the spider to the master pistons where they supplement the direct torque contributions of the master pistons. Thus the torque transmitted to the bank of cylinders by all the pistons is felt as reactions only between the master pistons and their respective cylinder walls. However, with the sliding ball arrangement shown in FIG. 7 the torque contributions of the secondary pistons are delivered to the bank of cylinders not via the spider and the master pistons but rather by a direct reaction between each secondary piston and its cylinder wall. Thus, the application of torque to the bank of cylinders is shared by reaction between each piston and its cylinder wall so as to even out pressure on the cylinder walls. The non-slidable connection between each master piston and the spider is, of course, retained in order to ensure correct circumferential registration of the spider with respect to the bank of cylinders.

The connection between the spider 7 and the static central shaft 3 of the bank of cylinders specifically described with reference to FIGS. 1 to 3 may be used or it may be modified as shown in FIG. 6 by providing the static shaft 3 with a crank 64 from which extends a cylindrical bearing portion 65 on an axis converging at an acute angle on the axis of the static shaft at the centre of the imaginary sphere. At a region where the angled bearing portion 65 nears the centre of the imaginary sphere this portion joins the inner end portion 66 of the static shaft lying on the axis thereof.

A power take-off shaft 46 rotatable with the bank of cylinders and coaxial with the static shaft 3 has its inner end portion formed into a recessed sphere 67 the recess 68 inside of which is cylindrical about the axis of the take-off shaft and opens away therefrom. Within the recess 68 is the inner end portion 66 of the static shaft 3 and suitable bearings 69 interpose such end portion and the cylindrical wall of the recess to allow rotation of the sphere 67 about the inner end portion of the static shaft. Needle bearings as shown are preferred.

The outer surface of the sphere is spherical about the centre of the imaginary sphere and the hub 70 of the spider which is either integral with, as shown, or rigidly secured to the radiating arms 15 thereof has an internal annular concave spherical surface 71 which embraces the sphere 67 so as to allow universal articulation between the spider and the sphere. For purposes of assembly the spider is split at its medial plane so that the annular spherical surface of the spider hub is split along an equatorial line. One side 72 of the hub is extended away from the take-off shaft 46 and has an internal substantially cylindrical open-ended space 73. Within this space is the anguled bearing portion 65 of the static shaft and suitable bearings 74 interpose such bearing portion and the cylindrical wall of the space 73 to allow rotation of the spider about the bearing portion. Needle bearings as shown are again preferred.

In another improvement for substantially balancing the centrifugal force of an orbiting piston the connection between a piston and the spider is again modified in order to allow limited movement of the piston radially of the spider. This is effected by replacing the ball on the gudgeon pin by a circular disc or cylinder having its axis lying radially of the spider, the piston being slidable with respect to the disc or cylinder radially of the spider.

A radially outwardly opening recess is provided in the piston radially inwardly of the disc or cylinder and sealing means are placed between the recesss and a radially inner face associated with the disc or cylinder. Hydraulic fluid is fed into the recess in the piston where a pressure is created in the recess substantially proportional to the square of the speed of rotation of the bank of cylinders and thus substantially proportional to the centrifugal force exerted by the orbiting piston on the wall of its cylinder and within its connection to the spider.

The pressure obtaining in the recess tends to force the piston and the disc or cylinder apart and thus exert a radially inward force on the piston. By correlating the radius of gyration of the piston, its weight and the area of the floor of the recess therewithin against the pressure exerted within the recess substantial equilibrium is established between the radially inward force and the centrifugal force acting on the orbiting piston. Thus the piston floats within its cylinder under all conditions of speed and temperature changes with but negligible pressure between piston and cylinder walls, this condition being automatically maintained throughout the entire speed and temperature range.

As specifically applied to the engine illustrated in FIGS. 1 to 3 the further modified connection between a double-acting double-ended piston and the spider is formed as shown in FIGS. 8 to 14 by cutting-away the portion of the piston 6 intermediate its ends to provide a transverse parallel-sided slot 75 opening radially outwardly of the spider. In the floor of the slot is cut a recess 76 which is cylindrical about a radius of the spider. In the case of a secondary piston as shown in FIGS. 8, 9 and 11, in the slot are slidably housed two identical bush portions 77 between which is a circular disc 78 having its axis lying radially of the spider. The disc is integrally with the gudgeon pin 13 and on either side thereof the curved surface of the disc is interrupted by an arcuate slot 79 opening radially outwardly of the disc. Within such slot is received a correspondingly shaped arcuate rib 80 formed on the surface of each bush bearing on the disc, the arrangement being such as to permit limited pivotal movement of the bush portions and the piston about the axis of the disc while preventing relative movement between the bush portions and the disc axially thereof or radially of the spider. Furthermore, since the side walls of the slot in a secondary piston and the slidably engaging surface of each bush portion are plane as shown in FIG. 11, the bush portions are permitted to be slidable in any direction relatively to the piston to accommodate movement of the piston circumferentially of the spider as well as radially thereof.

Figure 13:
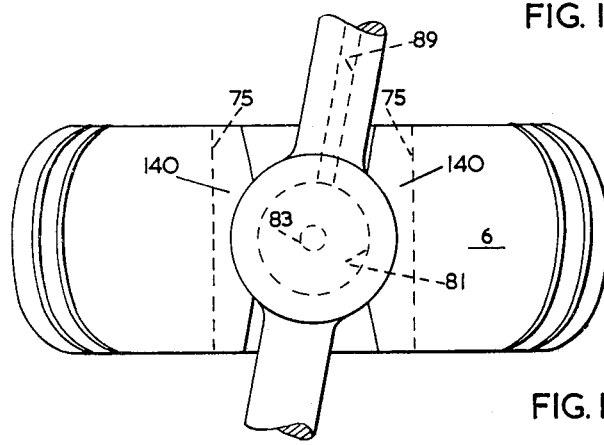

In the case of a master piston, however, the construction is formed as shown in FIGS. 12 and 13, by providing the two identical bush portions for the disc 78 on the gudgeon pin as extensions 140 from the side walls of the parallel-sided transverse slot 75, which extensions are either integral with or rigidly secured to the piston 6. In order to permit radial movement of piston about the disc the complementary cylindrical bearing surfaces of the extensions and the disc are uninterrupted. Otherwise the connection for a master piston as shown in FIGS. 12 and 13 is identical with the connection shown in FIGS. 8, 9 and 11 for a secondary piston.

A chamber 81 in the disc opens radially inwardly of the spider to interrupt the radially inner face of the disc. Attached to such radially inner surface is a thrust pad 82 providing a radially inner surface associated with the disc and closing the chamber 81 except for an aperture 83 provided centrally of the plate. The thrust pad extends slightly beyond the confines of the disc to overlap the bush portions or extensions and is at a clearance from the floor of the slot to allow limited movement of the piston relatively to the spider.

In the recess 76 is sladibly housed the radially inner portion of an annular sealing and bearing member 84 provided with a resilient sealing device, for example in the form of an O-ring 85, engaging the floor of the recess. A wider radially outer portion 86 of the annular sealing and bearing member 84 is separated from its radially inner portion by a radially inwardly facing annular shoulder 87 at a clearance from the floor of the slot in the piston. As shown in FIG. 14, the radially outer portion 86 of the annular sealing and bearing member 85 presents two concentric annular lands 88 and 88a bearing against the radially inner surface of the thrust pad 82, the outer land 88a and the annular recess 88b between same and the inner land 88 lying outside the axially projected circumference of the radially inner portion of the annular sealing and bearing member. One or more slots as at 88c are cut in the outer land for a purpose to be described hereinafter.

Each chamber 81 in the disc 78 is in communication with its respective chamber in a spider arm by means of ducts 89 in the gudgeon pin and the spider arm. The chamber in the spider arm is a continuation of radial threaded bore receiving the screw 18 which in association with the cap 17 retains one end of the gudgeon pin to the spider arm, and is radially outwardly closed by a plug insert 90 located against the radially inner end of the screw. Radially inwardly of the plug insert is an outwardly facing annular shoulder 91 from which a narrower bore extends radially inwardly to reach a further automatically facing annular shoulders 92 from which a still narrower bore 93 extends to the surface of a cylindrical housing 94 formed within the hub 70 of the spider. Within the said continuation bore and the said narrower bore a plunger 95 is housed for sliding movement radially of the spider. The plunger has a radially outer portion 96 to fit the said continuation bore and a narrower radially inner portion 97 to fit the said narrower bore, the two portions being separated by a radially inwardly facing annular shoulder 98 leaving an annular space 99 between the said shoulder 98 and the shoulder 91 in the spider arm which space is vented via port 100 to the interior of the engine. The space 101 radially outwardly of the plunger is also either vented as shown via port 102 to the interior of the engine or in communication with the low pressure side of a pump to be mentioned hereinafter by means of a port which is uncovered by the plunger when the pressure in the said space slightly exceeds requirements.

The plunger is hollow to house a sprung non-return valve member, the valve member, e.g. in the form of a ball 103, being urged onto a seat near the radially inner end of the plunger by a compression spring 104 retained between the valve member and a tubular member 105 secured within the plunger near the radially outer end thereof.

The connection between the spider and the static control shaft 3 of the bank of cylinders is similar to the corresponding connection shown in FIG. 6, the static shaft having a crank 64 from which extends a cylindrical bearing portion 65 on an axis converging at an acute angle on the axis of the static shaft at the centre of the imaginary sphere. At a region where the angled bearing portion nears the centre of the imaginary sphere this portion joins the inner end portion 66 of the static shaft lying on the axis thereof.

A power take-off shaft 46 coaxial with that part of the static shaft which is in axial alignment with the axis of the bank of cylinders is flanged at its inner end 106 for connection with the bank of cylinders via screws 107, and an inner shell 108 having slots therein to allow movement of the spider arms relative thereto. The cylinders are assembled about the inner shell which for ease of assembly is divided into two parts in a plane passing through the centre of the imaginary sphere and lying normally to the common axis of the static and power take-off shafts, the two parts of the shell having interlocking surfaces 109 and screws 110 being provided whereby properly to locate and secure the two parts together.

The end surface of the inner shell mating with the inner end surface of the power take-off shaft is interrupted by a countersunk bore 111 leading to an inwardly opening cylindrical recess 112 lying axially of the power take-off shaft. This recess receives a cylindrical shank 113 int tegral with an enlarged sphere 67 concentric with the imaginary sphere. An axial threaded bore 114 in the shank receives a screw 115 with a countersunk head received in the countersunk bore 111. The threaded bore 114 is extended to the centre of the sphere by a plain bore 116 receiving a plug insert 117 abutting the screw and retaining one end of a compression spring 118 for a non-return valve member, e.g. in the form of a ball 119, urged against a seat to close a short narrower bore 120 opening into a cylindrical recess 68 coaxial with the power take-off shaft and opening away from the shank.

The cylindrical recess 68 in the sphere rotatably receives the inner end portions 66 of the static shaft 3 preferably as shown within needle bearings 69. A portion of the inner shell 108 also rotatably receives a portion of the static shaft on the other side of the crank from the inner end portion and needle bearings 121 as shown again are preferred. Heat-insulating liners 4 are interposed between such bearings and the shell 108.

The cylindrical housing 94 within the spider hub extends axialy of the spider, opens towards the power take-off shaft 46 and partially encompasses the sphere 67. Between such housing and the sphere is a bearing insert 122 adapted to fit the housing and the sphere. The bearing insert is of suitable material such as phosphor bronze, which for ease of assembly is divided at the medial plane of the spider into two annuli having concave spherical inner surfaces complementary with the surface of the sphere and cylindrical outer surface complementary with the surface of the cylindrical housing 94 of the hub. The bearing insert 122 is retained in position between an annular shoulder 123 inside the hub and a retaining ring 124 secured by means of screws 125 to the power take-off shaft end of the hub. Beyond the shoulder towards the static shaft 3 the inner surface of the hub tapers with a clearance from the sphere to a further narrower cylindrical open ended space 73 extending axially of the spider and rotatably receiving, preferably as shown within needle bearings 74, the angled bearing portion 65 of the static shaft.

The said still narrower bore 93 in the spider arm extending to the surface of the cylindrical housing 94 of the spider hub encompassing the sphere 67 communicates with a hole 126 in the bearing insert 122. This hole in turn periodically communicates with a radial bore 127 in the sphere 67 during predetermined registration between the two. The radial bore in the sphere in turn communicates with the portion of the plain bore 116 in the sphere housing the spring 118 for the non-return valve.

The said short narrower bore 120 opening into the cylindrical recess 68 in the sphere 67 is in communication with a duct 128 passing through the static shaft 3 via a static tubular insert 129 sealingly received, e.g. by means of an O-ring 130, within a bore 131 in the inner end portion 66 of the static shaft and urged into sealing and bearing engagement with the floor of the cylindrical recess 68 in the sphere about the opening of the said short narrower bore 120 in the sphere, initially by means of a compression spring 132 between the tubular insert 129 and an annular shoulder 133 at one end of the said bore 131 in the inner end portion of the static shaft where such bore communicates with the duct 128.

The duct 128 in the static shaft is in communication with the high pressure side of a pump (not shown) delivering hydraulic fluid at a pressure slightly in excess of the maximum pressure requirements of the engine as will be discussed hereinafter. The pump is preferably of the spring discharge type adapted to deliver hydraulic fluid at a set pulsing pressure and operated by means of, for example, an eccentric, cam or crank arrangement driven by the engine. The delivery pressure of the fluid from the pump has little influence on the effective pressure at the piston bearing because the latter quantity is determined by the operation of the plunger 95 as described below.

In operation hydraulic fluid is delivered at pressure through the duct 128 in the static shaft 3 to enter the bore 131 in the inner end portion 66 of the static shaft where it acts on the spring engaging end of the tubular insert 129 to augment the spring pressure on the tubular insert and thus enhance its sealing engagement about the opening of the said short narrower bore 120 in the sphere 67, and then to open the valve in the sphere and enter the radial bore therein. When the said still narrower bore 93 in the spider arm is in line with the radial bore 127 in the sphere the hydraulic fluid enters space 134 radially inwardly of the plunger. The pressure in the space 101 radially outwardly of the plunger is governed by the centrifugal force exerted by the orbiting plunger 95 and initially, i.e. before hydraulic fluid enters the space 134 radially inwardly of the plunger 95, the condition obtaining may be expressed mathematically as follows:

$$P_1 A = m w^2 r$$

where $P_1$ is the initial pressure in the space 101 radially outwardly of the plunger, $A$ is the effective area of the radially outer end of the plunger, $m$ is the mass of the plunger, $w$ is the angular velocity of the engine and $r$ is the radius of gyration of the plunger.

When hydraulic fluid enters the space 134 radially inwardly of the plunger 95 the initial pressure in the space 101 radially outwardly of the plunger is increased without any virtual increase in the radius of gyration of the plunger since the hydraulic fluid is virtually incompressible. Thus the new condition obtaining may be expressed mathematically as follows:

$$P_1^1 A = m w^2 r + P_2 a$$

where $P_1^1$ is the increased pressure in the space radially outwardly of the plunger, $P_2$ is the pressure in the space radially inwardly of the plunger and is the effective area of the radially inner end of the plunger.

The last equation may be expressed otherwise as follows:

$$P_1^1 = m w^2 r / A + P_2 a / A$$

But for flow of hydraulic fluid throughout the non-return valve in the plunger from the space radially inwardly thereof to the space radially outwardly thereof:

$$P_2 > P_1^1$$

Therefore:

$$P_2 > m w^2 r / A + P_2 a / A$$

Thus:

$$P_2 (A - a) > m w^2 r$$

The last expression shows therefore that for flow of hydraulic fluid through the non-return valve in the plunger 95 from the space 134 radially inwardly thereof to the space 101 radially outwardly thereof the effective area of the radially outer end of the plunger must exceed the effective area of the radially inner end thereof and also the difference between these areas and the pressure in the space radially inwardly of the plunger must be such that the product of same exceeds the centrifugal force exerted by the orbiting plunger.

Due to slight leakage in the hydraulic system which in fact is beneficial as explained hereinafter, the plunger 95 would, but for the hydraulic liquid being fed to and topping up the space 101 radially outwardly of the plunger, move radially outwardly until it found solid end abutment against the plug insert 90 and fail to perform its hydraulic function. However, by introducing small quantities of hydraulic fluid into such space the pressure therein is not allowed to fall and does in fact tend to move the plunger radially inwardly until the port 102 for such space is uncovered and excess hydraulic fluid is bled to either, as shown, the interior of the engine or to the low pressure side of the pump. Thus the arrangement ensures that the plunger is at a substantially constant radial disposition while the engine is rotating at any speed within its operational range.

Since the radial disposition of the plunger is maintained substantially constant, the pressure in the space 101 radially outwardly of the plunger is substantially proportional to the square of the speed of rotation of the engine within its operational range. The maximum speed at which the space radially outwardly of the plunger can be replenished depends upon the maximum delivery pressure of the spring discharge pump. Operational speeds of up to and above 10,000 r.p.m. are at present envisaged according to engine capacity.

The pressure in the space 101 radially outwardly of the plunger is also felt in the chamber 81 in the disc 78 since the two are connected by means of ducts 89 within the spider arm and the gudgeon pin. The same pressure is also felt in the recess 76 in the piston within the annular sealing and bearing member 84. The hydraulic pressure thus exerts a radially inward thrust against the floor of the recess to counteract the centrifugal force exerted by the orbiting piston, the pressure being spread equally over all the area of the floor.

The two concentric lands 88 and 88$a$ bearing against the thrust pad 82 provide very effective sealing means even on the application of heavy loads, which are taken mainly by the hydraulic pressure acting on the opposing surfaces as distinct from the lands 88 and 88$a$. Hydraulic fluid within the inner land 88 is at the pressure exerted by the orbiting plunger and leaks very slightly over the inner land to provide boundary lubrication between same and the thrust pad. The leakage of hydraulic fluid causes a reservoir to be created in the recess 88b between the inner and outer lands which, since the outer land 88a is slotted as at 88c, is substantially at the pressure obtaining at the time within the interior of the engine. The annular reservoir of hydraulic fluid outside the inner land ensures the maintenance of lubricant between the inner land and the thrust pad.

By correlating the respective masses of the plunger 95 and the piston 6, the respective radii of gyration of the plunger and the piston and the respective areas of the radially outer end of the plunger and the floor of the recess 76 in the piston the radially inward thrust exerted by the pressure of the hydraulic fluid against the piston, within the operational range of the engine, balances substantially the centrifugal force of the orbiting piston since both these values are substantially proportional to the square of the speed of rotation of the engine within such range. The piston is thus caused substantially to float within its cylinder even at high speeds so as to exert but very slight pressure on the cylinder walls with consequent minimum friction and wear. Thermal expansion due to heat generated in the engine does not sensibly alter such balance while the radius of gyration of the piston increases the radius of gyration of the plunger, as determined by the radial disposition of the pressure relief port 102, also increases so that the proportionality between the two radii of gyration remains sensibly unaltered.

Any differential expansion that occurs between the spider and cylinders and any movement between a piston and the spider are accommodated by the clearance between the piston and the spider, that is to say; by the clearance between the thrust pad and the floor of the slot in the piston.

Referring again specifically to FIG. 8, the inner shell 108 replaces the inner annular wall 12 of the bank of cylinders shown in FIG. 1 and there is no direct connection between the two portions of the bank. In order, however, properly to locate and secure the two portions together each portion encompasses an outer centering surface 136 of the inner shell, which surface may be frusto-conical as shown or of other suitable contour, and an annular distance piece 137 co-operating with flanges 27 and the two parts 28 and 29 of the flange-connecting collar.

The induction system is also modified since the carburetted mixture is fed into the cylinders via passages 138 in the portion of the inner shell 108 rotatably receiving the portion of the static shaft on the other side of the crank 64 from the inner end portion 66. From the interior of the inner shell the mixture passes through the slots therein allowing movement of the spider arms into an annular space 139 defined between the inner shell, the pistons and the two parts of the bank of cylinders. The space 139 communicates with the inlet ports 36. The exhaust ports 37 are provided as before. The conical bodies 39 constituting the cylinder heads are provided substantially as before except that the end plates 40 are omitted. The spark plugs 41 are also positioned as shown in FIG. 1 and provided with the flat plates 43 to coact with the static plate (not shown).

The engine is also mounted in a similar manner to that shown in FIG. 1, the static shaft being anchored to a mounting 45e via a ported anchorage 45 through which a carburetted mixture is introduced to the passages 138, and a resilient annular sealing and bearing member 45i being interposed between the anchorage 45 and the inner shell 108 to either float or be secured to one or the other member. A suitable coupling 128a is secured to the outer end of the static shaft to receive a conduit leading from the pump (not shown) to the duct 128. The power take-off shaft is rotatable in a bearing 49a which accommodates longitudinal expansion of the shaft, the bearing being housed in bearing housing 49b secured to the mounting 45e. A retaining ring 49f secured to the bearing housing by means of screws 49g replace the circlip 49d shown in FIG. 1 for retaining the bearing in its housing.

Figure 16:
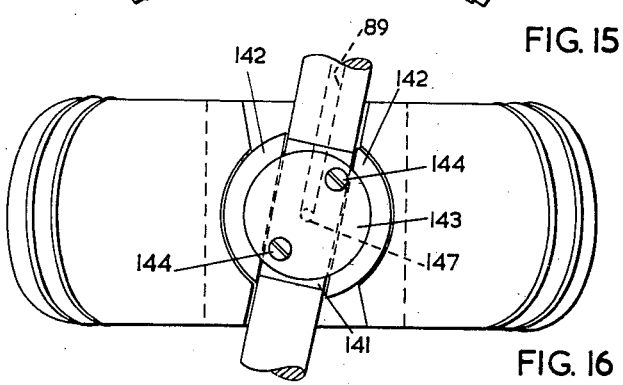

The connection shown in FIGS. 8, 9 and 11 for a secondary piston may be modified as shown in FIGS. 15 and 16 for use in conjunction with the master pistons shown in FIGS. 12 and 13, by providing the central portion 141 of the gudgeon pin with a rectangular cross section and providing the disc in the form of two identical disc segments 142 each slidable axially of the gudgeon pin along a side face of the rectangular-sectioned central portion thereof. The disc segments are constrained radially of the spider between the thrust pad 82 and a capping plate 143 secured by means of screws 144 to the radially outer face of the rectangular-sectioned central portion of the gudgeon pin, or by other conveneient means. The thrust pad is apertured centrally thereof as at 83 and the aperture extends through a short shank 145 extending from one side of the thrust pad. This shank is tightly received within a correspondingly shaped recess 146 opening into the radially inner face of the rectangular-sectioned central portion of the gudgeon pin so that the thrust pad fits against such inner face. The aperture in the thrust pad communicates with an opening 147 in the floor of the said recess which opening leads to the duct 89 in the gudgeon pin through which hydraulic fluid is supplied. The connection is otherwise identical with that for a master piston as shown in FIGS. 12 and 13.

As previously mentioned with reference to FIG. 7 in relation to the arrangement of a slidable ball 19 on a gudgeon pin to connect a secondary piston to the spider, with the provision of slidable disc segments 142 in the connections between the secondary pistons and the spider the application of torque to the bank of cylinders is shared by reaction between each piston and its cylinder wall whereas with the provision of rigid discs and slidable bush portions in the connections between the secondary pistons and the spider the application of torque to the bank of cylinders is by reaction between the master pistons and their respective cylinder walls.

As compared with the construction shown in FIGS. 8 and 10 in an alternative construction as shown in FIG. 17 hydraulic fluid is fed to the radial bore 127 in the sphere by means of a duct 148 passing through the power take-off shaft 46, and the screw 115 with the countersunk head and then into the sphere 67 where it meets the inner end of the radial bore 127. In such alternative construction the plug insert 117, the non-return valve member 119, its compression spring 118 and the short narrower bore 120 shown in FIGS. 8 and 10 are omitted from the sphere and the ducting 128, the tubular insert 129 and its compression spring 132 also shown in FIGS. 8 and 10 are omitted from the static shaft 3.

Whether the hydraulic fluid is fed through the static shaft as shown in FIGS. 8 and 10 or the power take-off shaft as shown in FIG. 17, in order that the radial bore 127 in the sphere be in continuous communication with the space 134 radially inwardly of the plunger 95 in the spider arm, the hole 126 in the bearing insert 122 between the cylindrical housing 94 in the spider hub and the sphere is alternatively enlarged as shown in FIG. 17 to receive the inner end of a tubular insert 149 in the spider arm. Such tubular insert is formed at its inner end into a concave spherical surface complementary with the surface of the sphere and sealingly and slidably engaging same. The concave inner end surface of the tubular insert is interrupted by a recess 150 sufficiently wide that the radial bore in the sphere is always opening thereinto. The floor of the recess is interrupted by a narrower bore 151 extending axially of the tubular insert and opening at the outer end thereof. The tubular insert is itself sealingly received, e.g. by an O-ring 152, in a recess 153 in the spider arm opening into the surface of the cylindrical housing in the spider hub and is urged into engagement with the sphere by a compression spring 154 constrained between the outer end of the tubular insert and an annular shoulder 155 in the space 134 radially inwardly of the plunger in the spider arm.

An alternative to the two land annular sealing and bearing member 85 described with reference to FIG. 14 is one having the same outer diameter throughout its thickness and comprising three concentric lands, the two inner of which are slotted so that the hydraulic liquid in the two annular reservoirs between the three lands is at the same pressure as the hydraulic liquid within the innermost land. Other arrangements of lands are also envisaged including features of both described arrangements.

An alternative to the plunger 95 described with reference to FIGS. 8, 9 and 10 is to provide a plunger having the same cross-sectional area along its length and having no bore therethrough. In such a construction ducting from the pump leads directly to the space 101 radially outwardly of the plunger and the space 134 radially inwardly of the plunger is closed except for a vent to the interior of the bank of cylinders. The radial disposition of the plunger is, as before, determined by the radial disposition of the port 102 for the space radially outwardly of the plunger which port is uncovered by the plunger when the pressure in such space slightly exceeds requirements.

A further alternative is to dispense with the orbiting plunger and simply to connect the recess in a piston with a pump which at least for a portion of its volumetric delivery produces a pressure substantially proportional to the square of the speed at which the engine is rotating. Such a pump is preferably mounted externally of the engine although it may be mounted internally and driven from the engine.

The connections in the spider arms between the duct in the static shaft or the power take-off shaft and the recesses 76 in the pistons are provided in either two opposite, alternate or all six spider arms, in order to preserve the dynamic balance of the spider, this being particularly important where the plungers are employed. A convenient arangement is to supply hydraulic liquid to the chambers in the discs via alternate spider arms as shown in FIG. 9, each of which supplies the two piston recesses 76 on opposite sides thereof. The recesses 76 may alternatively be connected among themselves, although this is not necessary in this arrangement.

The two kinds of constructions hereinbefore described for substantially balancing the centrifugal force of an orbiting piston, i.e. mechanically by means of a counterweight and lever arrangement as shown in FIGS. 6 and 7 and hydraulically by the application of fluid pressure on the piston as shown in FIGS. 8 to 17, may be employed in conjunction with each other.

The centre of articulation of a piston to the spider, i.e. the centre of the ball, disc or cylinder on the gudgeon pin may be on the pitch line of the piston or slightly displaced inwardly or outwardly therefrom radially of the spider in order to minimise rocking of a piston in its cylinder about an axis lying tangentially of the spider and passing through the centre of articulation when the piston is at its closest approach to a cylinder head i.e. at top dead centre, and when the combustible gases are ignited. As will be understood, an explosive force acting against a piston gives rise to a moment about the said axis but a resultant moment also occurs at top dead centre in the opposite sense due to the momentary difference in radii of gyration of the two ends of the piston and consequently difference in the centrifugal force applied at both ends of the piston. The relationship between these opposing moments depends upon such factors as engine design, running speed and throttle opening and accordingly these factors are taken into account to determine the optimum placing of the centre of articulation in relation to the piston.

What I claim is:

1. A fluid power mechanism comprising, in combination, a rigid structure defining a series of at least three ported cylinders symmetrically disposed about a first axis, each cylinder of the series being in the form of a torus the pitch line of which constitutes a line of longitude of an imaginary sphere, the cylinders of the series thereby being in a first zone of the sphere disposed about said first axis, a series of pistons fitting within said cylinders, said pistons occupying a second zone of the sphere within said first zone and being symmetrically disposed about a second axis lying obliquely to said first axis and intersecting it at the center of the sphere, support means for said pistons comprising bearings connected to said rigid structure and defining said second axis, a support structure including a spider having radially extending arms journalled on said second axis and carried by said bearings, said pistons being connected to and radially supported upon said support structure by articulation means permitting pivotal movement of each piston about a radius of the sphere and, except for one piston and, if desired, a diametrically opposed piston to said one piston, substantially circumferential movement relative to said second axis, an attaching means between each adjacent pair of arms forming a retainer for each circumferentially movable piston, the arrangement of the mechanism being such that during relative rotation, about said first axis, of the cylinders to the second axis the pistons slide sequentially in their respective cylinders.

2. A fluid power mechanism comprising, in combination, a rigid structure defining a series of at least three ported cylinders symmetrically disposed about a first axis, each cylinder of the series being in the form of a torus the pitch line of which constitutes a line of longitude of an imaginary sphere, the cylinders of the series thereby being in a first zone of the sphere disposed about said first axis, a series of pistons fitting within said cylinders, said pistons occupying a second zone of the sphere within said first zone and being symmetrically disposed about a second axis lying obliquely to said first axis and intersecting said first axis at the center of the sphere, support means for said pistons comprising bearings connected to said rigid structure and defining said second axis and a support structure carried by said bearings including a spider journalled thereon, said spider comprising arms extending radially to said second axis, a gudgeon pin attached between each adjacent pair of arms and respective articulation means connecting the pistons to said gudgeon pins and supporting the pistons radially thereon, said articulation means permitting pivotal movement of each piston about a radius of the sphere and, except for one piston and, if desired a diametrically opposed piston to said one piston, substantially circumferential movement relative to said second axis, the arrangement of the mechanism being such that during relative rotation, about said first axis, of the cylinders to the second axis, the pistons slide sequentially in their respective cylinders.

3. A mechanism according to claim 2 wherein bearing elements between said circumferentially movable pistons and their gudgeon pins cause said movement to take place in the plane of the spider.

4. A mechanism according to claim 2 wherein a slide block connects each circumferentially movable piston to its gudgeon pin to permit said movement, a rotational joint between the slide block and the gudgeon pin permitting said pivotal movement of each said piston.

5. A mechanism accordingly to claim 2 wherein at least one series of ports of the respective cylinders emerge through side walls thereof at circumferential regions externally of the cylinders and radially equidistant from said first axis, at least one closure member being arranged in radially sealing juxtaposition to said regions to seal each port when in coincidence with it, said member being rotatable relative to said rigid structure to coincide cyclically with successive ports and so control their periods of opening in each cycle of operation.

6. Mechanisms according to claim 5 in the form of pumps, motors and two-stroke internal combustion engines wherein the rigid structure rotates about said first axis and said closure member is stationary and is circumferentially adjustable to alter the timing of said ports.

7. A mechanism according to claim 2 wherein the series of cylinders is formed in two co-axial and adjoining spherical zones and two opposed series of pistons are provided fitting opposite ends of the cylinders, said two series of pistons being disposed about axes respectively oppositely inclined to the axis of the spherical zones.

8. In a rotary engine of the kind having toroidal cylinders symmetrically disposed about a center on a first axis and co-operating pistons symmetrically disposed about a second axis lying obliquely to said first axis and intersecting the first axis at said center, said pistons being connected to support means rotatable about said second axis, the improvement consisting of respective articulated mountings attaching each piston radially to said support means, said support including a central boss, arms extending outwardly from said boss terminating circumferentially intermediate of successive pistons, attaching means intermediate each adjacent pair of arms, and mountings including intermediate elements carried by said attaching means retaining the circumferentially movable pistons, said elements including bearing surfaces permitting rotation of each piston about a radial axis and displacement of each piston along its attaching means, each mounting including a pivot joint directed radially to the envelope of the cylinders and each, with an exception, including a connecting element permitting displacement of their respective pistons substantially circumferentially relative to said second axis, said exception consisting of one of said mountings and, permissibly, a mounting diametrically opposite to said one mounting.

9. In a rotary engine of the kind having toroidal cylinders symmetrically disposed about a center on a first axis and co-operating toroidal pistons symmetrically disposed about a second axis lying obliquely to said first axis and intersecting the first axis at said center, said pistons being connected to support means rotatable about said second axis, the improvement consisting of respective articulated mountings attaching said piston radially to said support means, said support means being formed as a structure including a central boss, arms extending outwardly from said boss and terminating circumferentially intermediate of successive pistons and a gudgeon pin attached across each adjacent pair of arms, said articulated mountings having a first series of intermediate elements and, with an exception, a second series of intermediate elements through which the pistons are connected to the gudgeon pins, said first series providing respective pivot joints permitting rotation of each piston about an axis radial to the envelope of the cylinders and said second series including bearing surfaces permitting displacement of each cylinder along its gudgeon pin, the exception of said second series consisting of one of said mounts and, permissibly, a mounting diametrically opposite to said one mounting.

10. A rotary engine according to claim 9 including reaction means acting upon the pistons, said means producing a radially inwards force upon the pistons in dependence upon the speed of rotation of the engine about said first axis.

11. A rotary engine according to claim 10 wherein said reaction means include at least one element rotating with the piston support means, transfer elements connecting said elements to piston carrying members to exert a radially inwards force upon the pistons supported thereby in dependence upon the force generated by rotation of said element, 12. An engine according to claim 9 wherein said support means carry fluid conduits to each of the pistons, exit means from said conduits being provided in a piston-bearing surface of each of said mountings, said conduits thereby forming means for the conveyance of pressure fluid to said bearing surfaces to exert a radially inwards force upon each piston in opposition to the centripetal force upon the piston during its rotation about said first axis.

13. A fluid power mechanism comprising, in combination, a rigid structure defining a series of at least three cylinders closed at both ends and symmetrically disposed about a first axis, each cylinder of the series being in the form of a torus the pitch line of which constitutes a line of longitude of an imaginary sphere, the cylinders thereby being in a first zone of a sphere disposed about said first axis, a series of double-acting pistons the opposed heads of each fitting the opposed end regions of respective cylinders, which pistons occupy a second zone of the sphere and are symmetrically disposed about a second axis lying obliquely to said first axis and intersecting it at the center of the sphere, said rigid structure having an access region intermediate the cylinder ends, support means for the pistons projecting into said region and comprising bearings connected to said rigid structure and defining said second axis, a spider carried by said bearings having arms extending radially to said second axis, a gudgeon pin attached between each adjacent pair of arms and articulation elements carried by said gudgeon pins connecting the pistons to the pins, said elements permitting pivotal movement of each piston about a radius of the sphere and, with an exception, permitting displacement of each piston transversely relative to the second axis, said exception being selected from one of the group consisting of one piston and two diametrically opposed pistons, the arrangement of the mechanism being such that during relative rotation, about said first axis, of the cylinders relative to the second axis, the pistons slide sequentially in their respective cylinders.

14. A fluid power mechanism according to claim 13 wherein a static member defines said second axis and said articulation elements also permit limited radial movement of each piston relative to the sphere, means being provided to produce a centripetal force acting on the pistons and increasing with the speed of rotation of the cylinders and their pistons about the first axis to exert a radially inwards force upon the pistons in opposition to their own centrifugal force.

15. A fluid power mechanism according to claim 14 wherein said centripetal means include a fluid pressure supply to the articulation elements, a chamber in communication with a radially outward facing surface of the piston and an annular sealing and bearing arrangement interposed between said chamber and the piston surface, said arrangement being compressible to permit radial movement of the piston relative to its member while maintaining a seal for the pressure fluid therein.

16. A fluid mechanism having a series of toroidal cylinders disposed symmetrically about and rotating around a first axis and a series of pistons fitting said cylinders and rotating therewith, a support structure for said pistons being journalled on a stationary second axis lying obliquely to said first axis, said cylinders and pistons having a common center of symmetry, connecting means for retaining the pistons on said support structure permitting transverse displacement of said pistons upon the structure relative to the second axis with the exception of at least one master piston, said connecting means additionally permitting, for all pistons, angular displacement and radial displacement relative to the second axis, reaction means acting upon said pistons comprising at least one element rotatable with the cylinders and pistons and transmission elements transferring the force developed by rotation of said element to the piston connecting means to act upon each piston in a radially inwards direction against the centrifugal force of the piston on said connecting means.

17. A mechanism according to claim 16 wherein said reaction means comprise at least one counterweight rotating with the cylinders and pistons and a lever system having pivotal connection to the support structure linking said counterweight to the piston connecting means.

18. A mechanism according to claim 16 wherein said reaction means comprises a fluid pump rotating with the cylinders and pistons, conduits carried by the support structure leading the fluid delivered therefrom to the piston connecting means.

19. A mechanism according to claim 16 wherein said reaction means comprises a plunger member closely fitting a radially directed bore, fluid supply means to said bore and communication means from said bore to the piston connecting means, the arrangement being such that the centrifugal force on said member is transmitted by the fluid in said communication means to the piston connecting means.

20. A mechanism according to claim 19 wherein said bore comprises an inner smaller diameter portion and an outer larger diameter portion, the plunger having a hollow body with external stepped portions fitting the respective bore portions, check means preventing inwards flow through said hollow body, said fluid supply means opening into the interior end of said smaller bore portion, two radially spaced ports being provided in said larger bore portion said ports lying within the length of the plunger outer portion, the arrangement being such that both ports are sealed when the plunger is in a central position and movement of the plunger from said position opens one of said ports to permit flow of the fluid out of the bore and so return the plunger to said position.

References Cited by the Examiner
UNITED STATES PATENTS

| | | | |
|---|---|---|---|
| 953,868 | 4/1910 | Tcherepanoff | 123—43 |
| 1,733,965 | 10/1929 | Howard | 123—43 |
| 1,738,963 | 12/1929 | Norton | 74—60 |
| 2,247,527 | 7/1941 | Stinnes | 74—60 |

FOREIGN PATENTS

| | | |
|---|---|---|
| 103,650 | 4/1938 | Australia. |
| 637,598 | 2/1928 | France. |
| 932,877 | 9/1955 | Germany. |
| 378,962 | 3/1940 | Italy. |

SAMUEL LEVINE, *Primary Examiner.*

KARL J. ALBRECHT, JOSEPH H. BRANSON, Jr.,
*Examiners.*